United States Patent
Gelfenbeyn et al.

(10) Patent No.: US 9,275,641 B1
(45) Date of Patent: Mar. 1, 2016

(54) PLATFORM FOR CREATING CUSTOMIZABLE DIALOG SYSTEM ENGINES

(71) Applicant: Speaktoit, Inc., Palo Alto, CA (US)

(72) Inventors: Ilya Genadevich Gelfenbeyn, Sunnyvale, CA (US); Artem Goncharuk, Arlington, VA (US); Pavel Aleksandrovich Sirotin, Sunnyvale, CA (US)

( * ) Notice: Subject to any disclaimer, the term of this patent is extended or adjusted under 35 U.S.C. 154(b) by 0 days.

(21) Appl. No.: 14/851,145

(22) Filed: Sep. 11, 2015

Related U.S. Application Data (60) Provisional application No. 62/050,149, filed on Sep. 14, 2014.

(51) Int. Cl.
```
G10L 15/22    (2006.01)
G10L 15/26    (2006.01)
G10L 15/18    (2013.01)
G10L 15/06    (2013.01)
```

(52) U.S. Cl.
CPC ............ *G10L 15/22* (2013.01); *G10L 15/06* (2013.01); *G10L 15/1822* (2013.01); *G10L 15/26* (2013.01); *G10L 2015/223* (2013.01)

(58) Field of Classification Search
CPC ...................................................... G10L 15/22
See application file for complete search history.

(56) References Cited

U.S. PATENT DOCUMENTS

| | | | | |
|---|---|---|---|---|
| 6,173,266 | B1 * | 1/2001 | Marx ..................... | G10L 15/22 704/270 |
| 6,418,440 | B1 * | 7/2002 | Kuo .................. | G06F 17/30654 704/200 |
| 7,143,042 | B1 * | 11/2006 | Sinai ..................... | G10L 15/22 704/270.1 |
| 8,065,151 | B1 * | 11/2011 | Bangalore ............. | G10L 15/193 704/270 |
| 2003/0220799 | A1 * | 11/2003 | Kim ..................... | G10L 15/22 704/277 |
| 2005/0033582 | A1 * | 2/2005 | Gadd ..................... | G06Q 30/02 704/277 |
| 2005/0228668 | A1 * | 10/2005 | Wilson .................. | G10L 15/22 704/256 |
| 2006/0025997 | A1 * | 2/2006 | Law ..................... | G10L 15/28 704/257 |
| 2006/0100875 | A1 * | 5/2006 | Schmidt ............... | G06F 17/278 704/257 |
| 2006/0203980 | A1 * | 9/2006 | Starkie .................. | G06F 8/30 379/88.18 |
| 2006/0229873 | A1 * | 10/2006 | Eide ..................... | G10L 15/22 704/260 |
| 2008/0319763 | A1 * | 12/2008 | Di Fabbrizio .......... | G10L 15/28 704/275 |
| 2009/0055163 | A1 * | 2/2009 | Jindal .................. | G06F 17/2881 704/9 |

OTHER PUBLICATIONS

Avaya, "Dialog designer call flow elements", [online], Avaya.com, 2009.*

* cited by examiner

*Primary Examiner* — Jialong He
(74) *Attorney, Agent, or Firm* — Georgiy L. Khayet (57) ABSTRACT

Provided are systems and methods for creating custom dialog system engines. The system comprises a dialog system interface installed on a first server or a user device and a platform deployed on a second server. The platform is configured to receive dialog system entities and intents associated with a developer profile and associate the dialog system entities with the dialog system intents to form a custom dialog system engine associated with the dialog system interface. The web platform receives a user request from the dialog system interface, activates the custom dialog system engine based on identification, and retrieves the dialog system entities and intents. The user request is processed by applying the dialog system entities and intents to generate a response to the user request. The response is sent to the dialog system interface.

20 Claims, 7 Drawing Sheets

PLATFORM FOR CREATING CUSTOMIZABLE DIALOG SYSTEM ENGINES

CROSS-REFERENCE TO RELATED APPLICATIONS

The present utility patent application is related to and claims priority benefit of the U.S. provisional application No. 62/050,149, filed on Sep. 14, 2014 under 35 U.S.C. 119(e). The contents of the provisional application are incorporated herein by reference for all purposes to the extent that such subject matter is not inconsistent herewith or limiting hereof.

TECHNICAL FIELD

This disclosure relates generally to dialog systems. More particularly, this disclosure relates to methods and a platform for creating custom dialog system engines for dialog system interfaces. The platform enables developers or engineers to create custom dialog system engines that operate as a backend service for dialog system interfaces, which can be an integral part of software applications, mobile applications, websites, or web services.

DISCLOSURE OF RELATED ART

Conventional dialog systems are widely used in the information technology industry, especially in the form of mobile applications for wireless telephones and tablet computers. Generally, a dialog system refers to a computer-based agent having a human-centric interface for accessing, processing, managing, and delivering information. Dialog systems are also known as chat information systems, spoken dialog systems, conversational agents, chatter robots, chatterbots, chatbots, chat agents, digital personal assistants, automated online assistants, and so forth. All these terms are within the scope of the present disclosure and referred to as a "dialog system" for simplicity.

Traditionally, a dialog system interacts with its users in natural language to simulate an intelligent conversation and provide personalized assistance to the users. For example, a user may generate requests to the dialog system in the form of conversational questions, such as "Where is the nearest hotel?" or "What is the weather like in Alexandria?" and receive corresponding answers from the dialog system in the form of audio and/or displayable messages. The users may also provide voice commands to the dialog system requesting the performance of certain functions including, for example, generating e-mails, making phone calls, searching particular information, acquiring data, navigating, requesting notifications or reminders, and so forth. These and other functionalities make dialog systems very popular because they are of great help, especially for holders of portable electronic devices such as smart phones, cellular phones, tablet computers, gaming consoles, and the like.

Although the demand for dialog systems is constantly growing, it is not an easy task to create a dialog system. Each dialog system has a dialog system engine, which is responsible for receiving user voice inputs and then transforming them into text inputs, interpreting text inputs, generating corresponding responses to text inputs, and delivering responses to the user. Interpreting the inputs and finding proper responses can be complicated and not trivial because dialog systems employ artificial intelligence. Accordingly, many developers and engineers can struggle to develop a well-operating dialog system enabled to handle a wide range of user requests. It can also be very expensive for software or engineering companies to create and integrate dialog systems into new software or hardware products.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment of the disclosure, a method for creating custom dialog system engines for dialog system interfaces is provided. The method can include enabling a developer, by a first server comprising at least one processor and a memory storing processor-executable codes, to create a developer profile. The method may further comprise receiving, by the first server, one or more dialog system entities associated with the developer profile and one or more dialog system intents associated with the developer profile. The one or more dialog system entities may be associated, by the first server, with the one or more dialog system intents to form a custom dialog system engine. The custom dialog system engine may be associated with a dialog system interface. The method may continue with receiving, by the first server or a second server, a user request from a dialog system interface. The dialog system interface may be installed on a user device or a third server. The dialog system interface may be identified by the first server or the second server based on an identification sent with the user request. Based on the identification of the dialog system interface, the custom dialog system engine may be activated, and the one or more dialog system entities and the one or more dialog system intents may be retrieved by the first server or the second server. Further, the user request may be processed, by the first server or the second server, by applying the one or more dialog system entities and the one or more dialog system intents. Based on the processing, a response to the user request may be generated by the first server or the second server and sent to the dialog system interface.

Additionally, the generated response may be displayed or played back to the user.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings, in which like references indicate similar elements and in which.

DETAILED DESCRIPTION

In the following description, numerous specific details are set forth in order to provide a thorough understanding of the presented concepts. The presented concepts may be practiced without some or all of these specific details. In other instances, well-known process operations have not been described in detail so as to not unnecessarily obscure the described concepts. While some concepts will be described in conjunction with the specific embodiments, it will be understood that these embodiments are not intended to be limiting.

The present technology provides for a platform enabling creation of custom dialog system engines serving as backend services for custom dialog system interfaces in an easy manner. Dialog system interfaces can be implemented at least as a part of various software applications, mobile applications, middleware applications, firmware applications, websites, web services, and so forth. In other words, dialog system interfaces are on a client side and provide a computer-human interface configured to at least acquire user inputs and deliver dialog system outputs to the users. Dialog system engines, on the other hand, support the dialog system interfaces by processing user inputs and generating corresponding responses thereto. Thus, a dialog system engine and dialog system interface, when interacting with each other, forms a dialog system. One may refer to a dialog system interface running on or accessed from a client device as a "frontend" user interface, while a dialog system engine, which supports the operation of such dialog system interface, can be referred to as a "backend" service.

The platform, according to various embodiments of the present disclosure, allows for developers and engineers to create custom dialog system engines that will support frontend dialog system interfaces. For example, if a software developer wants to integrate dialog system functionality into a mobile application as an additional feature, the developer can use the platform to create and deploy a custom dialog system engine and link it with the mobile application. The mobile application, in turn, will have only a dialog system interface. In this example, the dialog system interface can be activated by a user when he interacts with the mobile application. The user can make inquiries to the dialog system interface in the form of voice inputs or text inputs. Upon receipt of a user inquiry, the dialog system interface can transfer it with no or little pre-processing to the linked custom dialog system engine, which was previously created using the platform. The custom dialog system engine processes the received user inquiry, interprets it, and generates a response to the inquiry based on predetermined rules and settings. The response is then delivered to the dialog system interface for further visual or audio presentation to the user.

In general, dialog system interfaces can be integrated or be an integral part of a wide range of software applications running on a client device, such as personal computer (PC) or cellular phone, or on a server so that the dialog systems become a part of a website or web service. Dialog system engines can be implemented on a server such that their functionalities can be accessible to dialog system interfaces over the Internet, cellular networks, or any other communications means.

Figure 1:
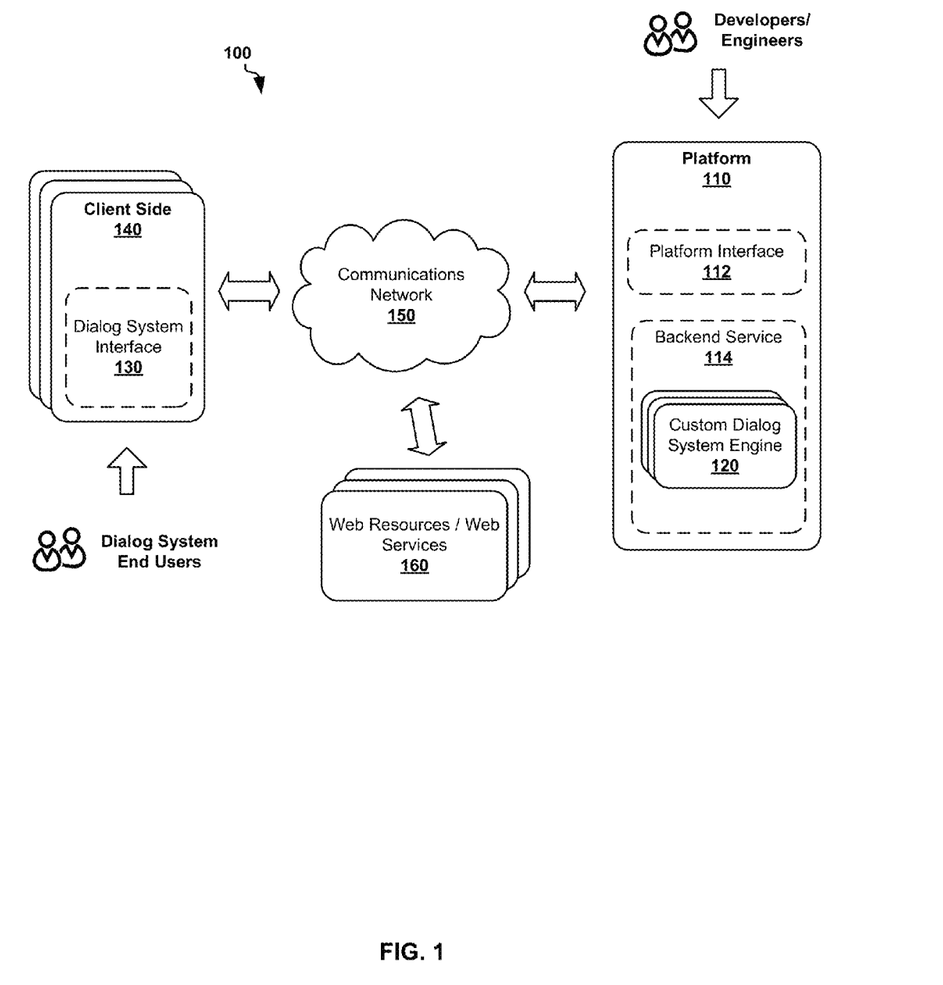
FIG. 1 illustrates an environment within which systems and methods for creating custom dialog system engines for dialog system interfaces can be implemented, in accordance with some embodiments.

FIG. 1 shows a high-level block diagram of example system environment 100 suitable for practicing the present technologies. As can be seen on FIG. 1, there is provided a platform 110 for creating and maintaining custom dialog system engines. For these ends, the platform 110 includes a platform interface 112 for creating custom dialog system engines and backend service 114 for maintaining and running custom dialog system engines 120. In some embodiments, the platform 110 is a web platform.

Platform interface 112 may include a GUI embedded into a webpage and accessible by developers via the Internet. In some other embodiments, however, platform interface 112 may be implemented as a software application such as a downloadable software application or any other software, middleware, or firmware running on or accessible from an electronic device such as a computer. In the example shown in FIG. 1, platform interface 112 is realized as a web accessible GUI as will be described below. For simplicity, this disclosure is limited to such embodiments where platform interface 112 is a server-based solution so that it is accessible via the Internet. Regardless of a particular implementation, platform interface 112 enables developers through a number of GUI tools to create one or more custom dialog system engines 120.

Still referencing to FIG. 1, backend service 114 is responsible for maintaining and running custom dialog system engines 120 that are created, for example, by or with the help of platform interface 112. Backend service 114 may operate as a web service providing functionality to custom dialog systems by enabling their dialog system interfaces to interact with custom dialog system engines 120 maintained at backend service 114 of platform 110.

As briefly discussed above, a dialog system interface 130 can be provided on a client side 140. The dialog system interface 130 may be as simple as a GUI enabling users to make inquiries, which are then delivered to backend service 114 for processing by corresponding dialog system engines 120, and to receive responses to the inquiries generated by dialog system engines 120. The dialog system interface 130 may be implemented as a stand-alone software application or it can be an integral part of a software application, web service, website, and the like.

Still referencing to FIG. 1, client side 140 may refer to, but is not limited to, a user device, terminal, computing device (e.g., laptop computer, tablet computer, desktop computer), cellular phone, smart phone, personal digital assistant (PDA), gaming console, remote control, multimedia system, smart television device, set-top box, infotainment system, in-vehicle computing device, informational kiosk, robot, and so forth. In these embodiments, one or more dialog system interfaces 130 may be implemented as software, middleware, or firmware installed on such devices.

In additional embodiments, client side 140 may refer to a networked or online solution such as a server, hosting service, web service, web site, cloud service, and so forth. For example, the dialog system interface 130 can be a widget or GUI provided on one or more web pages enabling end users to make inquiries and get responses thereto. This option is suitable for those instances when a developer, for example, wants to integrate a dialog system into his website to provide enhanced customer service.

As can be seen in FIG. 1, the interaction between the dialog system interfaces 130 and corresponding custom dialog system engines 120 is performed via a communications network 150. Communications network 150 may include one or more of the Internet, an intranet, a cellular network, a LAN, a WAN, an IEEE 802.11 based network, and so forth.

FIG. 1 also shows various third party web resources/services 160 provided via one or more web servers. These third party web resources/services 160 can provide information of various types to custom dialog system engines 120 or dialog system interfaces 130 as a part of a response to a user request. For example, web resources/services 160 may refer to email services, weather services, navigation services, and the like. Accordingly, if a user makes the inquiry "What is the weather like today?," such information may be automatically acquired by dialog system engine 120 from one or more third party web resources/services 160 and then integrated into a dialog system response to be delivered to the end user.

The process of creating and operating custom dialog system engines 120 will now be described with reference to FIG. 1 and other drawings. In particular, platform interface 112 provides one or more GUIs having a number of tools enabling developers/engineers to create and customize one or more "dialog system elements," which serve as a basis for a custom dialog system engine.

According to various embodiments, dialog system elements include at least "entities" and "intents." Each "entity" may refer to a number of objects having the same or similar characteristics. In other words, entities are lists of keywords defining objects of one class. In one example, an entity may refer to a keyword and a set of its synonyms. In another example, an entity may refer to a keyword and a set of its definitions. In yet another example, an entity may refer to a list (e.g., a list of cities, list of names, list of titles, list of brands, list of street names, etc.).

In some embodiments, the list of objects associated with the entity can be extended automatically. For example, a machine learned technique can be used to suggest one or more new objects to be associated with the entity. A machine learned algorithm can be trained using large texts and/or vocabularies. By way of example and not limitation, a developer of custom dialog system engine 120 can define an entity @city with values such as, for example, New York and Los Angeles. If a user of the custom dialog system engine utters or enters words "Washington, D.C.", then the entity @city can be automatically extended to New York, Los Angeles, and Washington D.C. since the machine-learning algorithm may determine that "Washington D.C." is related to objects listed in entity @city. In some embodiments, a user can be asked to confirm that the suggested object is related to the one or more entities.

In further embodiments, an entity can include a list of other entities. For example, a developer can define an entity @car as a list of entities (@make, @model), where values @make and @model may be set to any of objects with which @make and @model can be associated. For example, entity @car can include compound objects as {make:"Honda"; model:"Accord"}, {make:"Ford"; model:"Fiesta"}, and so forth.

Furthermore, each "intent" can include a dialog system interaction scheme, which provides a particular relation between a user request and a dialog system response. In some embodiments, intent can be determined as pattern that explicitly includes one or more references for entities. An example pattern is "what is the weather in @city:city", wherein "@city:city" is a reference for entity @city and parameter city inside the entity @city. In certain additional embodiments, to determine intent, instead of providing patterns containing explicit references for "entities", developers can just provide example requests (phrases) to illustrate intents and entities. In these embodiments, platform 110 automatically determines, using machine-learning techniques, what "entities" and "intents" are implied in example requests.

Based on pattern and/or example, requests platform 110 may create a corresponding action. The action can include a name and one or more parameters. For example, a request may be entered as follows: "weather forecast for Los Angeles". A machine learning technique can determine action with name "weather" and parameter names: city of data type @city.

Thus, developers can use the platform interface 112 to generate a plurality of entities and a plurality of intents, both being specific to a particular application or industry. These pluralities of entities and intents form dialog system engines 120 and enable them to perform certain actions or generate certain outputs in response to a wide range of end user inputs. In certain embodiments, intent can include a general structure: a name of intent (for user reference only), list of patterns and/or example requests, a name of action, parameters associated with the action, and fulfillment associated with the action. Fulfillment may include a text (highlighted text on a screen), or a code to call to a web service, make a request to database, and so forth. In some embodiments, the platform 112 can provide an action to developers and allow developers to write a custom fulfillment associated with the action directly into custom dialog system engine 120. In certain embodiments, developers may receive the action (name of action and parameters) and write the custom fulfillment on client side 140. For example, custom fulfillment may include a request to a website or database to retrieve information (a forecast, traffic information, navigation, and the like), to perform some operation of a device on which the dialog system interface is running on and the like.

In some embodiments, dialog system elements may include one or more contexts. The contexts can include one or more parameters containing labels, keys, or clues for intents during session for a particular end-user. The contexts may include pre-conditions and Boolean expression of the labels. The intent can be triggered based on the input context. For example, intent can be triggered when a certain pre-condition is met or a Boolean expression of pre-conditions is true. Output contexts are set into an end-user session when an intent is executed based on a user's request. In various embodiments, output contexts can be assigned a certain lifespan within a user session including several user requests. In some embodiments, the lifespan of an output context can be measured as a number of requests made during the user's session. Within the user session, there is a current context state, which exists prior to execution of an intent in response to the next user request, and a post-execution context state, which is set after the execution of the intent. The post-execution context state can include one or more newly added contexts based on the user request and results of the execution of the intent. Some of the old contexts can be deleted from the post-execution state based on the results of the execution of the intent or due to its expiration.

In further embodiments, one or more attributes or parameters can be assigned to a context. The attributes can be identified during execution of the intent and used in an actions associated with the intent. The values retrieved form the contexts can form parameters for the action. The attributes can be further put in output contexts set after execution of the intent.

Figure 2:
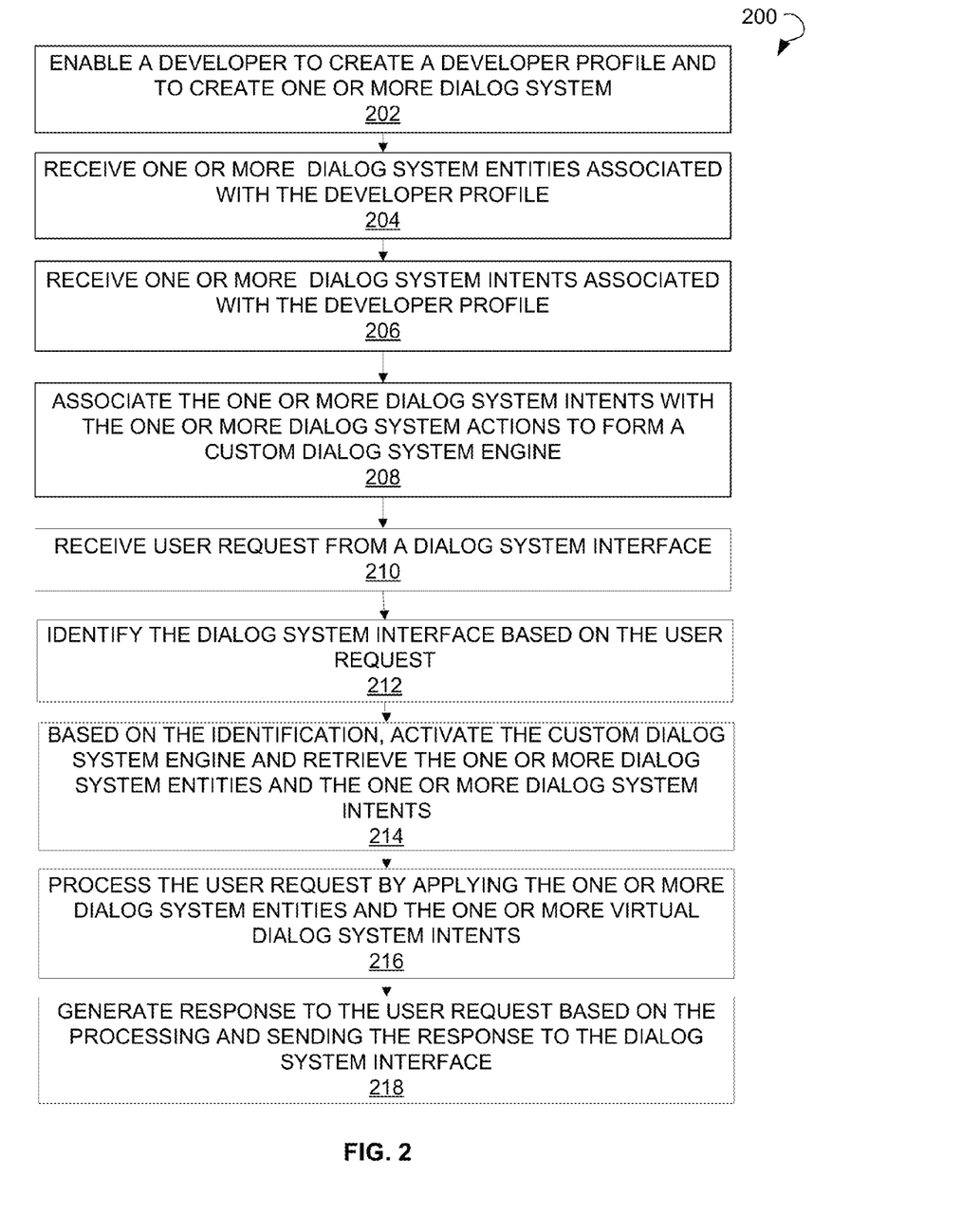
FIG. 2 is a process flow diagram showing a method for creating custom dialog system engines using the platform and for operating the platform, according to an example embodiment.

FIG. 2 is a process flow diagram showing a method 200 for creating custom dialog system engines using the platform 110 and for operating the platform 110, according to an example embodiment. The method 200 may be performed by processing logic that may comprise hardware (e.g., decision-making logic, dedicated logic, programmable logic, and microcode), software (such as software run on a general-purpose computer system or a dedicated machine), or a combination of both. In one example embodiment, the processing logic refers to one or more components of the platform 110. Notably, the below recited steps of method 200 may be implemented in an order different than described and shown in FIG. 2. Moreover, the method 200 may have additional steps not shown herein, but which can be evident for those skilled in the art from the present disclosure. The method 200 may also have fewer steps than outlined below and shown in FIG. 2.

The method 200 commences at operation 202 with enabling a developer (or engineer) to register with the platform 110 and create a developer profile by a first server comprising at least one processor and a memory storing processor-executable codes. For these ends, the developer interacts with the platform interface 112. The developer profile may virtually link (associate) a custom dialog system engine 120 of the developer and one or more dialog system interfaces 130 deployed on the client side. The linking may include stipulating Application Programming Codes (API), rules for interaction, destination addresses, and many more. In certain embodiments, the developer profile can be accesses by multiple developers. At operation 202, the method may allow the developer to create one or more dialog systems. Each dialog system can be associated with an access identifier (ID). The access ID can be used to access the dialog system from the Client Side 140 via authentication. In various embodiments, the access ID may include tokens, (digital) keys, and so forth.

At operation 204, the platform 110 receives from the developer one or more dialog system entities and stores the same at a database. In some embodiments, the entities are not received but created by the developer using web tools of the platform interface 112. The dialog system entities may include a keyword and at least one synonym to the keyword, a keyword and at least one definition of the keyword, a list of keywords defining objects of one class, and so forth.

At operation 206, the platform 110 receives from the developer one or more dialog system intents and stores the same at the database. In some embodiments, the dialog system intents are not received, but created by the developer using tools of the platform interface 112. As described above, the intents form dialog system elements (custom logic enabling the dialog system engine to generate responses tailored for specific needs). The dialog system intents may include a dialog system interaction scheme, a rule defining a relation between a user request and a dialog system response, a rule of relationship between a particular action and the one or more dialog system entities, and so forth. In some embodiments, the developer can explicitly define one or more dialog system entities to be used in one or more dialog system intents. Additionally or alternatively, the developer can provide example request(s) (phrases). Based on the example requests, the platform 110 may suggest one or more dialog system entities. To suggest the entities, the platform 110 may first search the appropriate entities in the list of entities provided by developer at operation 204. In some embodiments, the platform 110 may suggest new dialog system entities via a machine-learning technique. The developer can be allowed to approve, modify, or change parameters of the suggested new dialog system entities.

It should be noted that the definition of an entity is not static. During further operations, platform 110 may dynamically redefine the entities defined by the developer. The entities can be redefined (augmented) based on user profile, preferences, user requests, and the like. The redefined entities are used by the platform 110 in further processing.

At operation 208, the platform 110 associates one or more dialog system intents with one or more dialog system actions to create (form) the custom dialog system engine 120. The custom dialog system engine 120 is associated with one or more dialog system interfaces 130 of the developer. Each of the actions is defined by a name and set of aliases associated with the dialog system entities.

Operations 202-208 illustrate a set-up process for the custom dialog system engine 120, while operations 210-218 illustrate the operation of custom dialog system engine 120. In particular, once all dialog system elements of custom dialog system engine 120 are created, they are maintained as a backend service and enable any of the associated dialog system interfaces 130 to provide the full functionality of the dialog system to users according to predetermined settings.

Specifically, at operation 210, the platform 110 receives a user request from an unidentified dialog system interface. The user request can be a voice input or text input. In some embodiments, the dialog system interface can pre-process the user input, for example, by recognizing spoken words and transforming the voice input into text input. In other embodiments, however, no pre-processing is performed by the dialog system interface.

At operation 212, the platform 110 processes the user request and identifies the dialog system interface. The user request can be accompanied by an identifier at the time the user request is sent from the dialog system interface to platform 110.

At operation 214, based on the result of identification at operation 212, the platform 110 activates the custom dialog system engine 120 associated with the identified dialog system interface 130. At the same operation 214, platform 110 may also retrieve or identify one or more dialog system elements (i.e., one or more entities and one or more intents) based on the result of identification at operation 212. At the operation 214, platform 110 may identify contexts (one or more labels, keys, clues, and logical expressions of thereof) associated with the user request and a particular request session.

At operation 216, the custom dialog system engine 120 processes the user request using mentioned dialog system elements (i.e., one or more entities and one or more intents) as retrieved at operation 214. The one or more intents can be triggered based on contexts. The contexts can be pre-defined, determined based on the user requests, and further changed after one or more intents are triggered. The contexts can be specific for a particular user and particular session of the user. Some examples of dialog system processing are further described with reference to FIG. 3.

At operation 218, the custom dialog system engine 120 generates a response and sends it to the dialog system interface 130 associated with the custom dialog system engine 120. The response may include particular data, for example a text message, and/or and one or more actions. Each action can include a name of the action and a set of parameters identified with the use of one or more intents and the one or more entities. The dialog system interface 130 may then display or playback the text message to the end user depending on predetermined settings. The dialog system interface 130 can also perform one or more operations based on the one or more actions using action name and set of parameters and according to a custom fulfillment associated with action. In some embodiments, the custom dialog system engine 120 can process the custom fulfillment and send the results to the dialog system interface 130.

Figure 3:
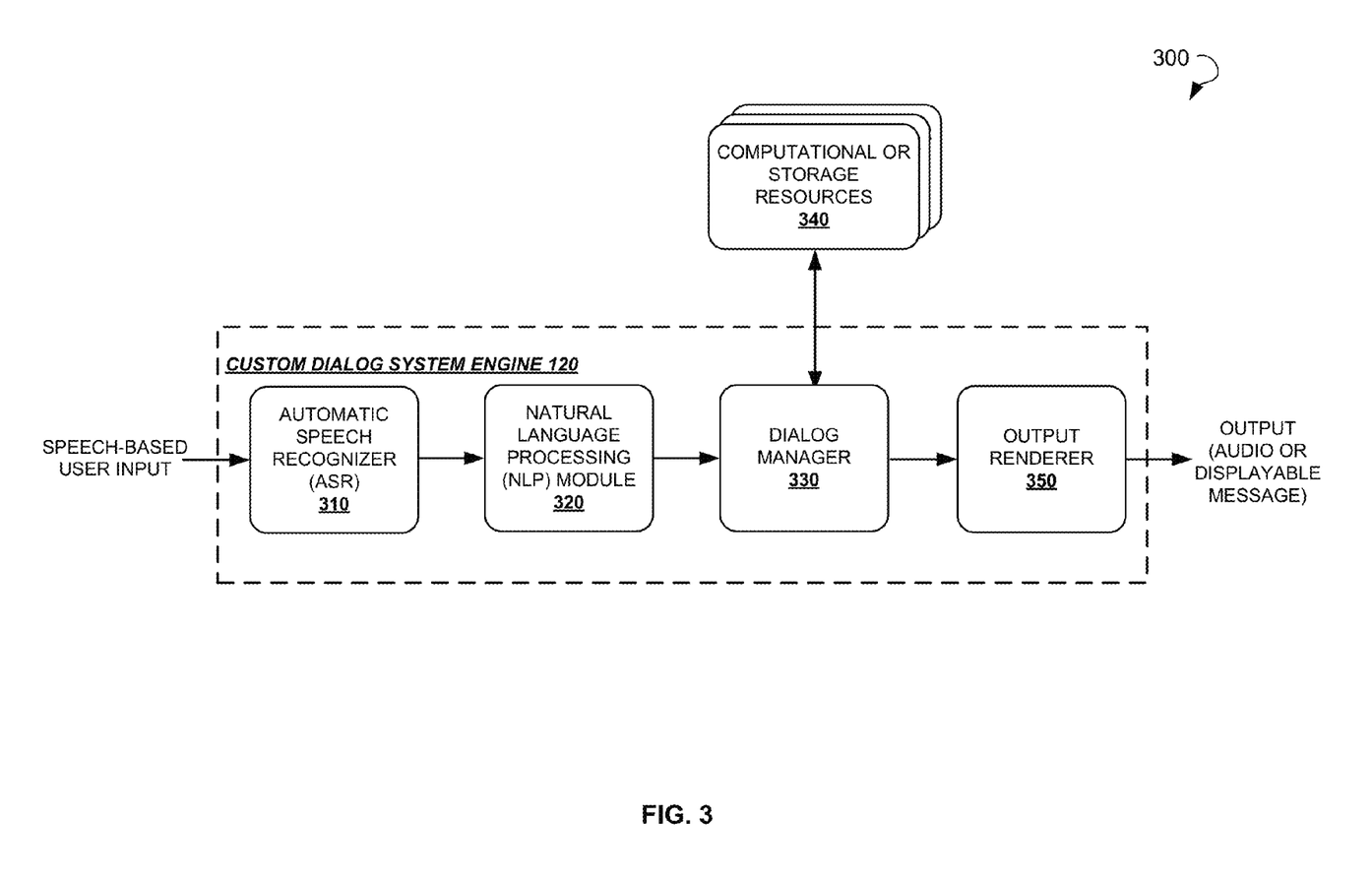
FIG. 3 shows a high-level architecture of an exemplary dialog system engine, according to an example embodiment.

FIG. 3 shows a high-level architecture 300 of exemplary dialog system engine 120, according to an example embodiment. It should be noted that every module of the dialog system engine 120 or associated architecture includes hardware components, software components, or a combination thereof. The dialog system engine 120 may be embedded or installed in a user device or server, or may be presented as a cloud computing module and/or a distributed computing module.

In the embodiment shown, the dialog system engine 120 includes an Automatic Speech Recognizer (ASR) 310 configured to receive and process speech-based user inputs into a sequence of parameter vectors. The ASR 310 further converts the sequence of parameter vectors into a recognized input (i.e., a textual input having one or more words, phrases, or sentences). The ASR 310 includes one or more speech recognizers such as a pattern-based speech recognizer, free-dictation recognizer, address book based recognizer, dynamically created recognizer, and so forth.

Further, the dialog system engine 120 includes a Natural Language Processing (NLP) module 320 for understanding spoken language input. Specifically, the NLP module 320 may disassemble and parse the recognized input to produce utterances, which are then analyzed utilizing, for example, morphological analysis, part-of-speech tagging, shallow parsing, neural networks, machine learning classifier, pattern-mined classifier, and the like. NLP module 320 may then map recognized input or its parts to meaning representations.

The dialog system engine 120 further includes a dialog manager 330, which coordinates the activity of all components, controls dialog flows, and communicates with external applications, devices, services, or resources. The dialog manager 330 may play many roles, which include discourse analysis, knowledge database query, and system action prediction based on the discourse context. In some embodiments, the dialog manager 330 may contact one or more task managers (not shown) that may have knowledge of specific task domains. In some embodiments, the dialog manager 330 may communicate with various computing, logic, or storage resources 340, which may include, for example, a content storage, rules database, recommendation database, push notification database, electronic address book, email or text agents, dialog history database, disparate knowledge databases, map database, points of interest database, geographical location determiner, clock, wireless network detector, search engines, social networking websites, blogging websites, news feeds services, and many more. In some embodiments, computational or storage resources 340 include one or more web resources/services 160 discussed above.

During operation, for example within a dialog session, the dialog manager 330 may control dialog flows according to input and output contexts. The input contexts represent some of pre-conditions for intent execution. A particular intent will trigger only if a certain input context(s) is present in a user request or as result of execution of previous intents. If several intents can be triggered based on the same context, then decision which intent is to be executed can be based on a weight of the intent related to the context, age of context, and other parameters as specified in the preferences. Newer context can have a higher priority. Output contexts can be set upon a match and execution of the intent.

In various embodiments, dialog manager 330 can pass the user request to dialog systems. The dialog systems can include custom dialog systems designed by a developer as described in FIG. 1 and FIG. 2. At the same time, in some embodiments, the user requests can be sent in parallel to task domains. The task domains are pre-build dialog system that may process the request and provide an answer. In some embodiments, if the custom dialog systems fail to provide an answer to the user request, then the dialog manager 330 proceeds with an answer received from the task domains.

The dialog manager 330 may employ multiple disparate approaches to generate outputs in response to recognized inputs. Some approaches include the use of statistical analysis, machine-learning algorithms (e.g., neural networks), heuristic analysis, and so forth. The dialog manager 330 is one of the central components of dialog system engine 120. The major role of the dialog manager 330 is to select the correct system actions based on observed evidences and inferred dialog states from the results of NLP (e.g., dialog act, user goal, and discourse history). In addition, the dialog manager 330 can handle errors when the user input has ASR and NLP errors caused by noises or unexpected inputs.

The dialog system engine 120 may further include an output renderer 350 for transforming the action selected by the dialog manager 330 into output in a form suitable for providing to the user. For example, the output renderer 350 may employ a text-to-speech engine or may contact a pre-recorded audio database to generate an audio message corresponding to the output of the dialog manager 330. In certain embodiments, the output renderer 350 may present or cause to present the output of the dialog manager 330 as a text message, an image, or a video message for further displaying on a display screen of the user device.

In other embodiments, output render 350 provides a selected action (a name of an action and set of parameters) to dialog system interface 130 on the client side 140. Developers may configure the dialog system interface 130 to process the selected action and perform one or more required operations like sending a request to a web service, database operations, display a text message, play an audio or video on the user device, generate a text, process it through a text-to-speech system, and so forth. In some embodiments, developers may configure the custom dialog system engine 120 to process the action according to fulfillment associated with the action and provide the result to the dialog system interface 130.

Another important aspect of the present technology is that the techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, tablet computer, laptop computer), game console, handheld gaming device, cellular phone, smart phone, smart television system, and so forth.

Figure 4:
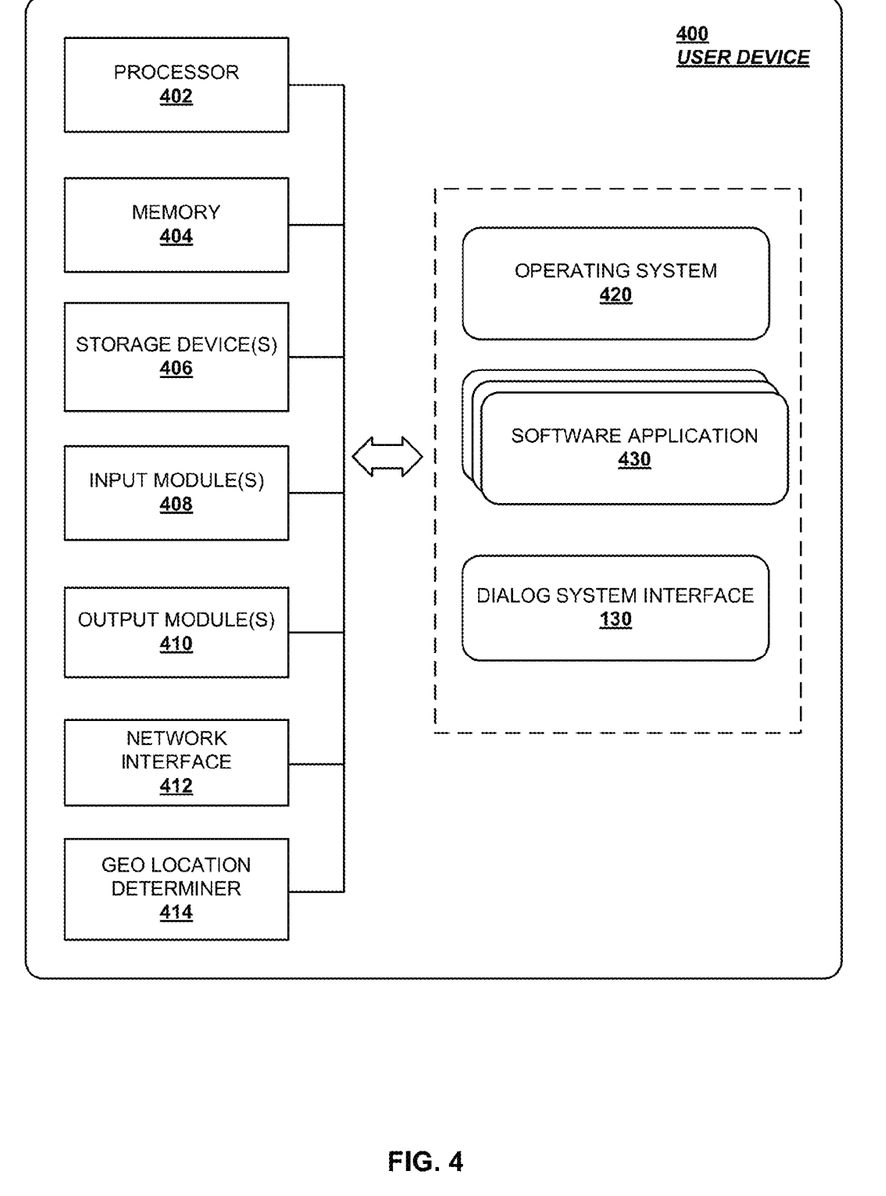
FIG. 4 is a high-level block diagram illustrating an example user device suitable for implementing the methods for creating custom dialog system engines.

FIG. 4 is a high-level block diagram illustrating an example user device 400 suitable for implementing the methods described herein. It is worth mentioning that all components of the user device may include logic elements, hardware components, software (firmware) components, virtual components, or a combination thereof. The user device 400 may include, be, or be an integral part of one or more of a variety of types of devices and systems such as a general-purpose computer, desktop computer, server, computer network, network service, cloud-computing service, and so forth. Further, all modules shown in FIG. 4 may be operatively coupled using any suitable wired, wireless, radio, electrical, or optical standards. As already outlined above, the user device 400 may refer to a smart phone, wireless telephone, computer, such as a tablet computer or desktop computer, infotainment system, in-vehicle computing device, and the like.

As shown in FIG. 4, the user device 400 includes the following hardware components: one or more processors 402, memory 404, one or more storage devices 406, one or more input modules 408, one or more output modules 410, network interface 412, and optional geo location determiner 414. The user device 400 also includes the following software or virtual components: an operating system 420, one or more software applications 430, and dialog system interface 130, which can be a stand-alone software application or be integrated into one or more software applications 430. The dialog system interface 130 provides a human-centric interface for accessing and managing information as discussed herein.

In some embodiments, the processors 402 are configured to implement functionality and/or process instructions for execution within the user device 400. For example, the processor(s) 402 may process instructions stored in memory 404 and/or instructions stored on storage devices 406. Such instructions may include components of an operating system 420 and dialog system interface 130. The user device 400 may also include one or more additional components not shown in FIG. 4, such as a housing, power supply, communication bus, and the like. These elements are omitted so as to not burden the description of the present embodiments.

Memory 404, according to one example embodiment, is configured to store information within the user device 400 during operation. Memory 404, in some example embodiments, may refer to a non-transitory computer-readable storage medium or a computer-readable storage device. In some examples, memory 404 is a temporary memory, meaning that a primary purpose of memory 404 may not be long-term storage. Memory 404 may also refer to a volatile memory, meaning that memory 404 does not maintain stored contents when memory 404 is not receiving power. Examples of volatile memories include random access memories (RAM), dynamic random access memories (DRAM), static random access memories (SRAM), and other forms of volatile memories known in the art. In some examples, memory 404 is used to store program instructions for execution by the processors 402. Memory 404, in one example embodiment, is used by software (e.g., the operating system 420) or dialog system interface 130 executing on user device 400 to temporarily store information during program execution. One or more storage devices 406 can also include one or more transitory or non-transitory computer-readable storage media and/or computer-readable storage devices. In some embodiments, storage devices 406 may be configured to store greater amounts of information than memory 404. Storage devices 406 may further be configured for long-term storage of information. In some examples, the storage devices 406 include non-volatile storage elements. Examples of such non-volatile storage elements include magnetic hard discs, optical discs, solid-state discs, flash memories, forms of electrically programmable memories (EPROM) or electrically erasable and programmable memories (EEPROM), and other forms of non-volatile memories known in the art.

Still referencing to FIG. 4, the user device 400 includes one or more input modules 408. The input modules 408 are configured to receive user inputs. Examples of input modules 408 include a microphone, keyboard, keypad, mouse, trackball, touchscreen, touchpad, or any other device capable of detecting an input from a user or other source in the form of speech, audio, or tactile actions, and relaying the input to the user device 400 or components thereof.

The output modules 410, in some example embodiments, are configured to provide output to users through visual or auditory channels. Output modules 410 may include a video graphics adapter card, a liquid crystal display (LCD) monitor, a light emitting diode (LED) monitor, sound card, speaker, or any other device capable of generating output that may be intelligible to a user.

The user device 400, in certain example embodiments, includes network interface 412. The network interface 412 can be utilized to communicate with external devices, servers, networked systems via one or more communications networks such as one or more wired, wireless, or optical networks including, for example, the Internet, intranet, LAN, WAN, cellular phone networks (e.g. Global System for Mobile (GSM) communications network, packet switching communications network, circuit switching communications network), Bluetooth radio, and an IEEE 802.11-based radio frequency network, among others. The network interface 412 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as Universal Serial Bus (USB).

The user device 400 may further include a geo location determiner 414 for determining a current geographical location of the user device. The geo location determiner 414 may utilize a number of different methods for determining geographical location including, for example, receiving and processing signals of Global Positioning Systems (GPS), GLONASS satellite navigation systems, or the Galileo satellite navigation system; utilizing multilateration of radio signals between radio towers (base stations); or utilizing geolocation methods associated with Internet Protocol (IP) addresses, Media Access Control (MAC) addresses, Radio-Frequency Identification (RFID), or other technologies.

The operating system 420 may control one or more functionalities of user device 400 or components thereof. For example, the operating system 420 may interact with the dialog system interface 130, and may further facilitate one or more interactions between applications 430 and one or more of processors 402, memory 404, storage devices 406, input modules 408, and output modules 410. As shown in FIG. 4, the operating system 420 may interact with or be otherwise coupled to the dialog system interface 130 and components thereof. In some embodiments, the dialog system interface 130 can be included into the operating system 420. Notably, the user device 400 and its components such as the dialog system interface 130, may also interact with one or more remote storage or computing resources including, for example, web resources, web sites, social networking websites, blogging websites, news feeds, email servers, web calendars, event databases, ticket aggregators, map databases, points of interest databases, and so forth.

Platform 110 shown in FIG. 1 may have similar or the same architecture as shown in FIG. 4 and described above. For simplicity, hardware implementation of platform 110 is not repeated in this disclosure, but it shall be understood by those skilled in the art that platform 110 may run on a server or any suitable computing device with the architecture including at least one or more processors, at least one memory, and a network interface.

Figure 5:
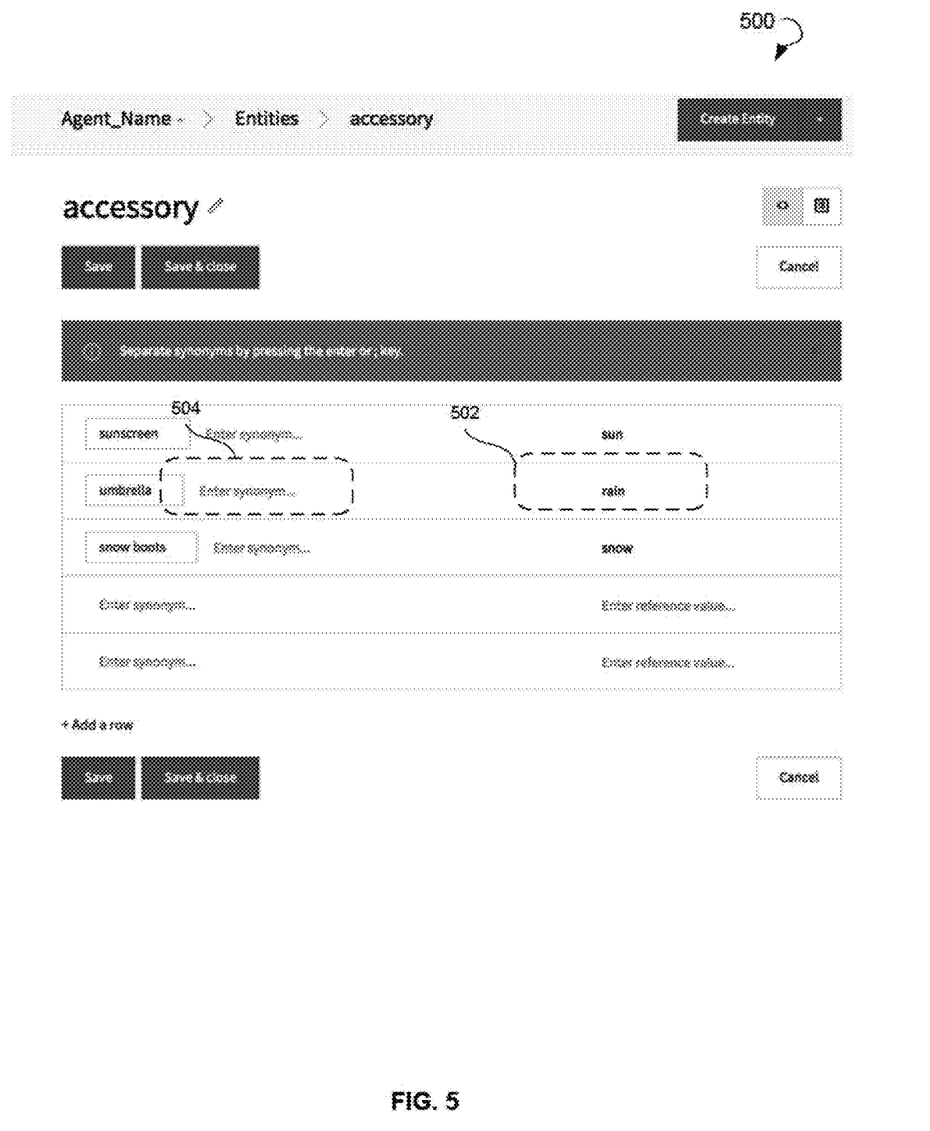
FIG. 5 shows an example Graphical User Interface (GUI) of platform interface for creating a new dialog system entity, according to an example embodiment.

FIG. 5 shows an example GUI 500 of platform interface 112 for creating a new dialog system entity as discussed above. When the developer desires to create custom dialog system engine 120, he may define dialog system entities and intents using web tools of platform interface 112, such as GUI

500. Using the GUI 500, the developer can enter reference value 502 for a keyword and enter synonym 504 for the provided reference value in the corresponding fields provided by GUI 500. The dialog system entities may include a keyword (or reference value) and synonyms to the keyword, a keyword and definitions of the keyword, a list of keywords defining objects of one class, and so forth. Keywords or reference values with their synonyms and/or definitions compose a dialog system entity.

In some embodiments, each entity can have a title. For example, one entity can be titled as "city" and contain a list of cities such as Arlington, Alexandria, Boston, and so forth. In other embodiments, an entity can be titled as a keyword and it can contain synonyms and/or definitions of this keyword. In one example, the entity called "music" may include the terms of song, singer, singing, musician, and so forth. In another example, the entity called "artist" may include a list music bands, music ensembles, or music artists. In another example, the entity called "Beatles" may include a list of possible synonyms, such as "The Beatles," "Beatles," "Fab Four," "Liverpool Legends," "John Lennon," and so forth. In yet another example, there can be an entity called "Artist," which may include various artist names, artist name synonyms, music band names, and so forth.

Figure 6:
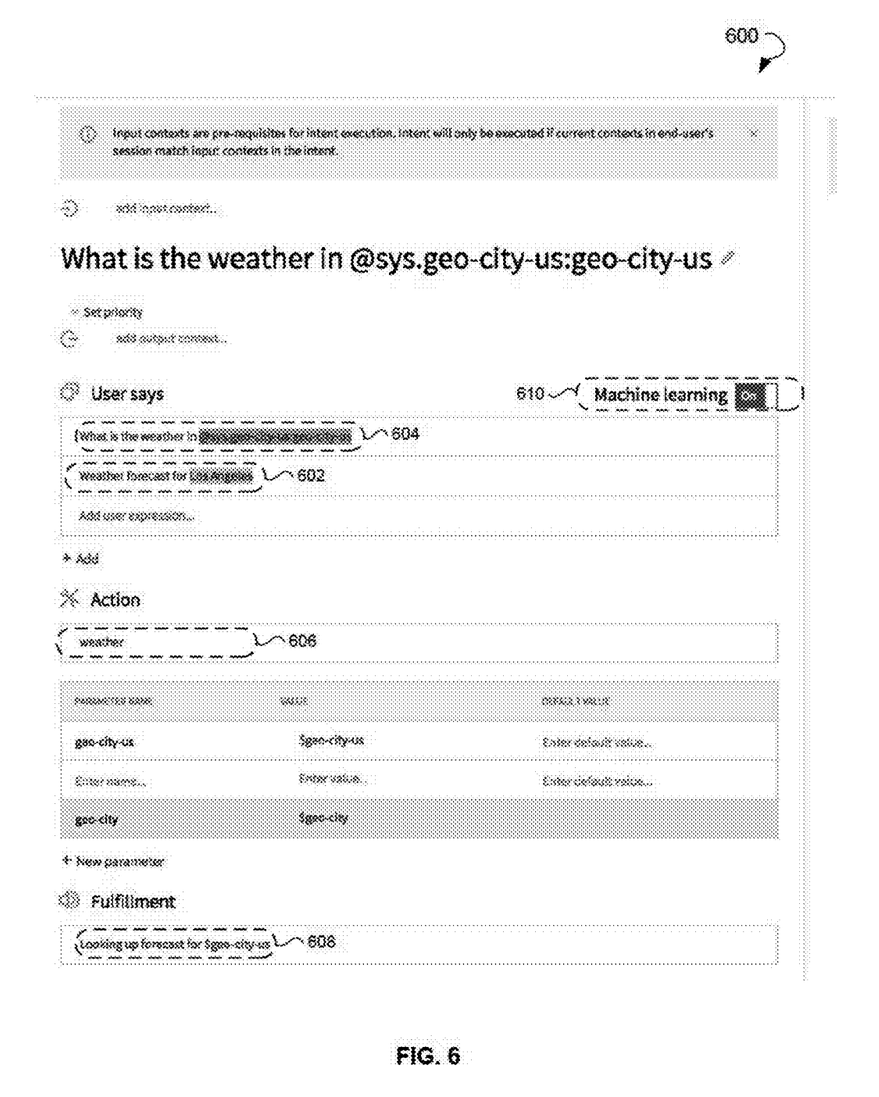
FIG. 6 shows an example GUI of platform interface for creating a new dialog system intent, according to an example embodiment.

FIG. 6 shows an example GUI 600 of platform interface 112 for creating a new dialog system intent as discussed above. The dialog system intent may define a relation between a user request and a dialog system response and may be associated with a rule based on a relationship between a particular action and an entity. In general, each intent can be represented as the following computer-readable procedure "[Action] @[Entity]" or "[Action] @[Entities]." Using GUI 600, developer may add user expression 602 (e.g. "Weather @city") to illustrate intents and entities. Based on the user expression 602, platform 110 automatically determines, using machine-learning techniques, what entities and intents are implied in example requests and creates a corresponding rule. For example, the developer may simply provide example requests, such as "Weather forecast for Los Angeles". The platform 110 may match "Los Angeles" to existing entities (system or user defined) and generate corresponding "[Action] @[Entity]" rules automatically. Additionally or alternatively, the developer may provide an example request where one or more entities are presented explicitly, such as "What is the weather in @say.geo-city:geo-city-us". In example of FIG. 6, "weather" and parameters associated with action 606 are "geo-city-us" and "geo-city". The developer can further modify action 606 and provide a fulfillment 608 for action 606.

The created rule means that a particular Action shall be performed by a client side 140 with respect to the Entity or several Entities. For example, one intent may be represented as "looking up forecast for $geo-city-us." In this example, the intent orders the dialog system engine 120 to look for forecast in Los Angeles.

In some embodiments, GUI 600 provides control 610 for machine learning. Toggling machine learning can allow handling fuzziness of the match ranging from hard/rigid matches to broad fuzzy or machine learned matches.

Figure 7:
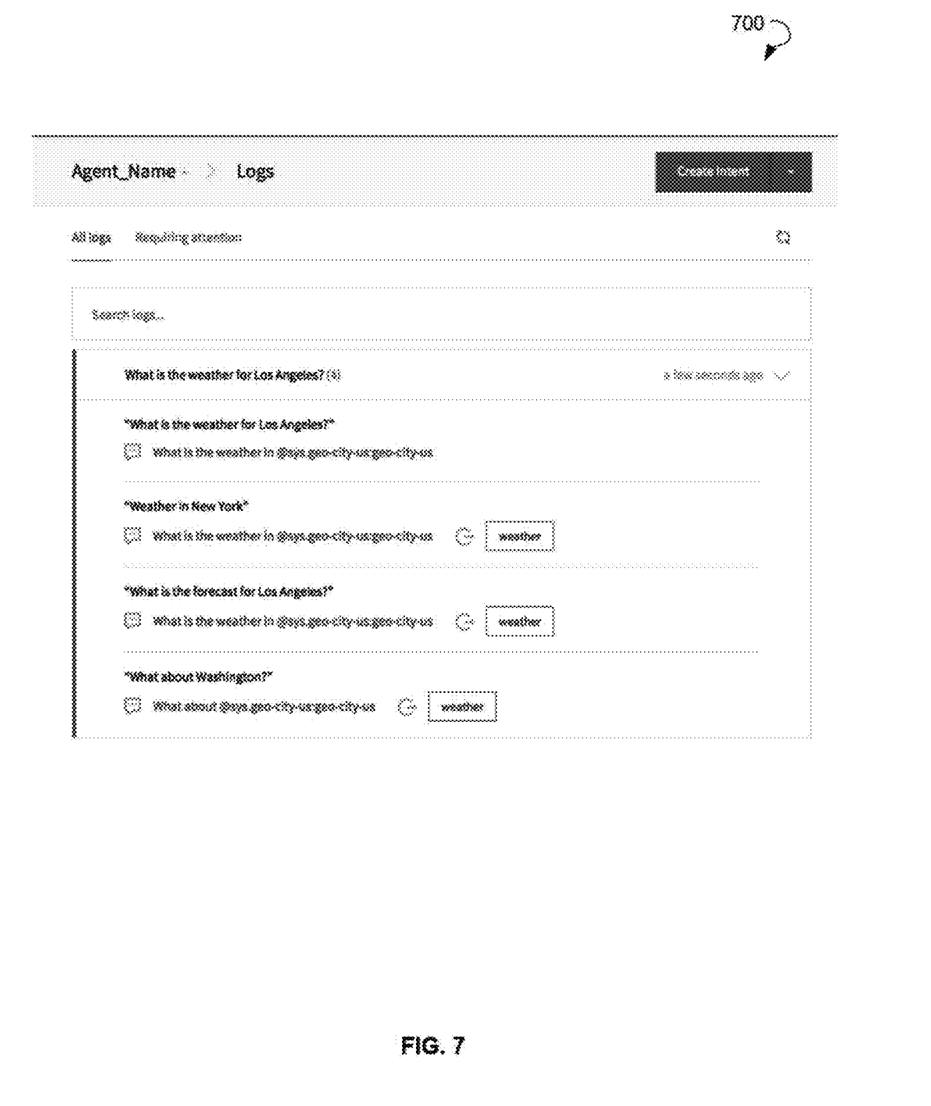
FIG. 7 shows an example GUI of a platform interface for providing logs for processing requests by a dialog system, according to an example embodiment.

In some embodiments, platform interface 112 may provide GUI for providing logs of requests and processing intents associated with a particular dialog system end user or group of end users. FIG. 7 shows an example GUI 700 for providing a log of requests of a particular user.

In various embodiments, platform interface 112 may provide developers with tools for statistical analysis of performance of a custom dialog system. The resulting statistics may include a number of sessions, number of requests, number of classified requests (for which at least one intent is triggered), number of unclassified requests (for which no intent is triggered), precision, recall, F-scores for requests, and the like. In some embodiments, unclassified requests are divided in groups based on a machine learning clustering.

In further embodiments, platform interface 112 may provide tools for marking up entities in unclassified requests by a developer or a machine learning technique to modify or generate new entities, intents, actions and fulfillment for the request. The platform interface 112 may include tools for re-classifying the request by one or more custom dialog systems.

Thus, methods for creating custom dialog system engines have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method, comprising:
   enabling a developer, by a first server comprising at least one processor and a memory storing processor-executable codes, to create a developer profile;
   receiving, by the first server, one or more developer example requests, wherein each of the developer example requests is associated with one or more phrases;
   determining, by the first server, one or more dialog system entities from the one or more example requests using a machine-learning technique, wherein the one or more dialog system entities are associated with the developer profile;
   determining, by the first server, one or more dialog system intents from the one or more developer example requests using a machine-learning technique, wherein the one or more dialog system intents are associated with the developer profile;
   associating, by the first server, the one or more dialog system entities with the one or more dialog system intents to form a custom dialog system engine;
   linking, by the first server, the custom dialog system engine with a dialog system interface using the developer profile, wherein the dialog system interface is provided on a client user device or a web server;
   receiving, by the first server or a second server, a user request from the dialog system interface, wherein the dialog system interface is installed on a user device or a third server;
   identifying, by the first server or the second server, the dialog system interface based on the user request;
   based on the identification of the dialog system interface, activating, by the first server or the second server, the custom dialog system engine and retrieving the one or more dialog system entities and the one or more dialog system intents;
   processing, by the first server or the second server, the user request by applying the one or more dialog system entities and the one or more dialog system intents; and
   generating, by the first server or the second server, a response to the user request based on the processing and sending the response to the dialog system interface.

2. The method of claim 1, wherein the one or more dialog system entities include one or more of the following: a keyword and at least one synonym to the keyword, a keyword and at least one definition of the keyword, and a list of keywords defining objects of one class.

3. The method of claim 1, wherein the one or more dialog system intents include one or more of the following: a dialog system interaction scheme, a rule defining a relation between a user request and a dialog system response, and a rule of relationship between a particular action and the one or more dialog system entities.

4. The method of claim 1, further comprising creating, by web tools of a platform interface, the one or more dialog system entities and the one or more dialog system intents based on a developer input.

5. The method of claim 1, wherein the identification is based on an identifier of the dialog system interface, the identifier accompanying the user request.

6. The method of claim 1, further comprising displaying the response to the user.

7. The method of claim 1, further comprising playing back the response to the user.

8. The method of claim 1, further comprising:
pre-processing the user request to recognize one or more spoken words, wherein the user request includes a voice input; and
transforming the voice input into text input.

9. A system comprising at least one processor and a memory storing processor-executable codes, wherein when the processor-executable codes are executed by the at least one processor, the processor-executable codes cause the at least one processor to:
receive, by the first server, one or more developer example requests, wherein each of the developer example requests is associated with one or more phrases;
determine one or more dialog system entities from the one or more developer example requests using a machine-learning technique, wherein the one or more dialog system entities are associated with a developer profile;
determine one or more dialog system intents from the one or more developer example requests using a machine-learning technique, wherein the one or more dialog system intents are associated with the developer profile;
associate the one or more dialog system entities with the one or more dialog system intents to form a custom dialog system engine;
link the custom dialog system engine with a dialog system interface using the developer profile, wherein the dialog system interface is provided on a client user device or a web server;
receive a user request from the dialog system interface;
identify the dialog system interface based on the user request;
based on the identification of the dialog system interface, activate the custom dialog system engine and retrieve the one or more dialog system entities and the one or more dialog system intents;
process the user request by applying the one or more dialog system entities and the one or more dialog system intents to the user request; and
generate a response to the user request based on the processing and send the response to the dialog system interface.

10. The system of claim 9, wherein the dialog system interface is further configured to enable the developer to create the developer profile.

11. The system of claim 9, wherein the user request is accompanied with an identifier of the dialog system interface for the identification.

12. The system of claim 9, wherein the processor-executable codes further cause the at least one processor to display the response to the user.

13. The system of claim 9, wherein the processor-executable codes further cause the at least one processor to playback the response to the user.

14. The system of claim 9, wherein the custom dialog system engine includes an Automatic Speech Recognizer (ASR), a Natural Language Processing (NLP), a dialog manager, and an output renderer.

15. The system of claim 14, wherein the ASR is configured to:
receive speech-based user inputs; and
process the speech-based user inputs into a sequence of parameter vectors.

16. The system of claim 14, wherein the ASR includes one or more of the following: a pattern-based speech recognizer, a free-dictation recognizer, an address book based recognizer, and a dynamically created recognizer.

17. The system of claim 14, wherein the NLP is configured to:
disassemble recognized input received from the ASR;
parse the recognized input to produce utterances;
analyze the utterances utilizing one or more of the following: morphological analysis, part-of-speech tagging, shallow parsing; and
map the recognized input or one or more parts of the recognized input to meaning representations.

18. The system of claim 14, wherein the dialog manager is configured to:
communicate with external resources;
process recognized input using one or more of the following: discourse analysis, knowledge database query, and system action prediction based on discourse context; and
select an action based on the processing and analysis of the NLP.

19. The system of claim 14, wherein the output renderer is configured to:
transform action selected by the dialog manager into output, wherein the output includes an operation, a text message, an image, and a video message.

20. A non-transitory processor-readable medium having instructions stored thereon, which when executed by one or more processors, cause the one or more processors to implement a method, comprising:
receiving one or more developer example requests, wherein the developer example requests are associated with one or more phrases;
determining one or more dialog system entities from the one or more developer example requests using a machine-learning technique, wherein the one or more dialog system entities are associated with a developer profile;
determining one or more dialog system intents from the one or more developer example requests using a machine-learning technique, wherein the one or more dialog system intents are associated with the developer profile;
associating the one or more dialog system entities with the one or more dialog system intents to form a custom dialog system engine;
linking the custom dialog system engine with a dialog system interface using the developer profile, wherein the dialog system interface is provided on a client user device or a web server;

receiving a user request from the dialog system interface, wherein the dialog system interface is installed on a user device or a third server;

identifying the dialog system interface based on the user request;

based on the identification of the dialog system interface, activating the custom dialog system engine and retrieving the one or more dialog system entities and the one or more dialog system intents;

processing the user request by applying the one or more dialog system entities and the one or more dialog system intents; and generating a response to the user request based on the processing and sending the response to the dialog system interface.

* * * * *